(12) United States Patent
Mohan et al.

(10) Patent No.: US 9,747,378 B1
(45) Date of Patent: Aug. 29, 2017

(54) LINKED WEB PRESENCE PAGES ASSOCIATED WITH A TOP LEVEL DOMAIN

(71) Applicants: Cedarampattu Mohan, Horsham, PA (US); James Galvin, Horsham, PA (US)

(72) Inventors: Cedarampattu Mohan, Horsham, PA (US); James Galvin, Horsham, PA (US)

(73) Assignee: Afilias PLC, Dublin (IE)

( * ) Notice: Subject to any disclaimer, the term of this patent is extended or adjusted under 35 U.S.C. 154(b) by 0 days.

(21) Appl. No.: 15/232,462

(22) Filed: Aug. 9, 2016

(51) Int. Cl.
*G06F 17/30* (2006.01)
*H04L 29/08* (2006.01)
*H04L 29/12* (2006.01)
*G06F 17/27* (2006.01)

(52) U.S. Cl.
CPC .... *G06F 17/30867* (2013.01); *G06F 17/3089* (2013.01); *H04L 61/1511* (2013.01); *H04L 61/3015* (2013.01); *H04L 67/02* (2013.01); *H04L 67/306* (2013.01); *G06F 17/2705* (2013.01)

(58) Field of Classification Search
CPC .................................. G06F 17/30; G06F 17/00
See application file for complete search history.

(56) References Cited

U.S. PATENT DOCUMENTS

| | | | |
|---|---|---|---|
| 6,772,167 B1 * | 8/2004 | Snavely | G06F 21/6227 |
| 8,543,719 B2 * | 9/2013 | Oh | H04W 4/00 |
| | | | 455/301 |
| 2006/0021018 A1 * | 1/2006 | Hinton | H04L 63/06 |
| | | | 726/10 |
| 2006/0021019 A1 * | 1/2006 | Hinton | G06F 21/41 |
| | | | 726/10 |
| 2006/0048216 A1 * | 3/2006 | Hinton | H04L 63/0815 |
| | | | 726/8 |
| 2006/0143250 A1 * | 6/2006 | Peterson | G06F 17/30153 |
| 2006/0143251 A1 * | 6/2006 | Peterson | G06F 17/30153 |
| 2006/0143252 A1 * | 6/2006 | Perterson | G06F 17/30153 |
| 2006/0143253 A1 * | 6/2006 | Peterson | G06F 17/30153 |
| 2006/0178918 A1 * | 8/2006 | Mikurak | G06Q 10/06 |
| | | | 705/7.25 |
| 2006/0218628 A1 * | 9/2006 | Hinton | H04L 63/0815 |
| | | | 726/8 |
| 2007/0043692 A1 * | 2/2007 | Oh | H04W 4/00 |

(Continued)

*Primary Examiner* — Farhan Syed
(74) *Attorney, Agent, or Firm* — Haynes and Boone, LLP

(57) ABSTRACT

A system for providing a directory service for generating web presence pages made available on a network may include a computer processor and memory having instructions stored thereon. The instructions may instruct the computer processor to parse registration information of a registrant domain name to obtain keywords and to search the network using the keywords for information about the registrant. Registrant information may be created based on information obtained, and a trusted web presence page may be generated. The trusted web presence page may include at least a first portion of the registrant information as read only content. A link may be created between a profile page and the trusted web presence page. The profile page may include at least a customizable second portion of the registrant information. The trusted web presence page may be published on the network.

22 Claims, 3 Drawing Sheets

(56) References Cited

U.S. PATENT DOCUMENTS

2007/0250863 A1* 10/2007 Ferguson ............. H04H 20/106
  725/46
2010/0275014 A1* 10/2010 Kelley .................... G06F 21/51
  713/157
2011/0276993 A1* 11/2011 Ferguson ............... H04N 7/173
  725/30
2017/0109341 A1* 4/2017 Issa ....................... G06F 17/248

* cited by examiner

LINKED WEB PRESENCE PAGES ASSOCIATED WITH A TOP LEVEL DOMAIN

FIELD

The present invention is related to generation and customization of web pages.

BACKGROUND

In the current realm of digital communication, users share information they consider important over the Internet, using published content such as wikis, blogs, social networking and other Web site content publication forums. Unfortunately, digital content can include valuable as well as biased, false and demagogic information.

As such, the Web has become a familiar way of acquiring and sharing information that also allows content owners and network users to contribute and express themselves. Thus, information providers (e.g. Web site owners) and information seekers (e.g. network users) will rely more and more on content available over the Web, and therefore the ability to provide as well as to access trusted Web content will become even more essential.

Trustworthiness of Web content, as well as access to content via Web navigation tools, refers to the believability and trustworthiness of a content/navigation tool source. In the case of Web trustworthiness, it refers to the trustworthiness of the content available on the Web. Web content and web page navigation tools can take many forms including text, sounds, videos, and images as well as hyperlinks, drop down menus, etc.

It is a disadvantage with the current structure of Web pages that multimedia and/or navigational tools encountered by the network user can unknowingly include false or otherwise malicious content. While it is true that network users and content providers alike enjoy the lower cost and increased access to information provided by the current world of interconnected Web pages, i.e. enabled users to access content from a number of deemed appropriate sources including Websites, blogs, e-news, wikis, e-books, e-libraries and e-journals, what bears important consideration is whether the vast amount of Web information provided and accessed can be relied upon to be trustworthy. As such, it can be very difficult for a typical network user to adequately verify given information without any prior knowledge, and the same is true for content providers in being able to prove to the network users that the information published is accurate and deemed as trustworthy.

BRIEF DESCRIPTION OF THE DRAWINGS

Exemplary embodiments of the invention will now be described in conjunction with the following drawings, by way of example only, in which.

SUMMARY

Figure 1:
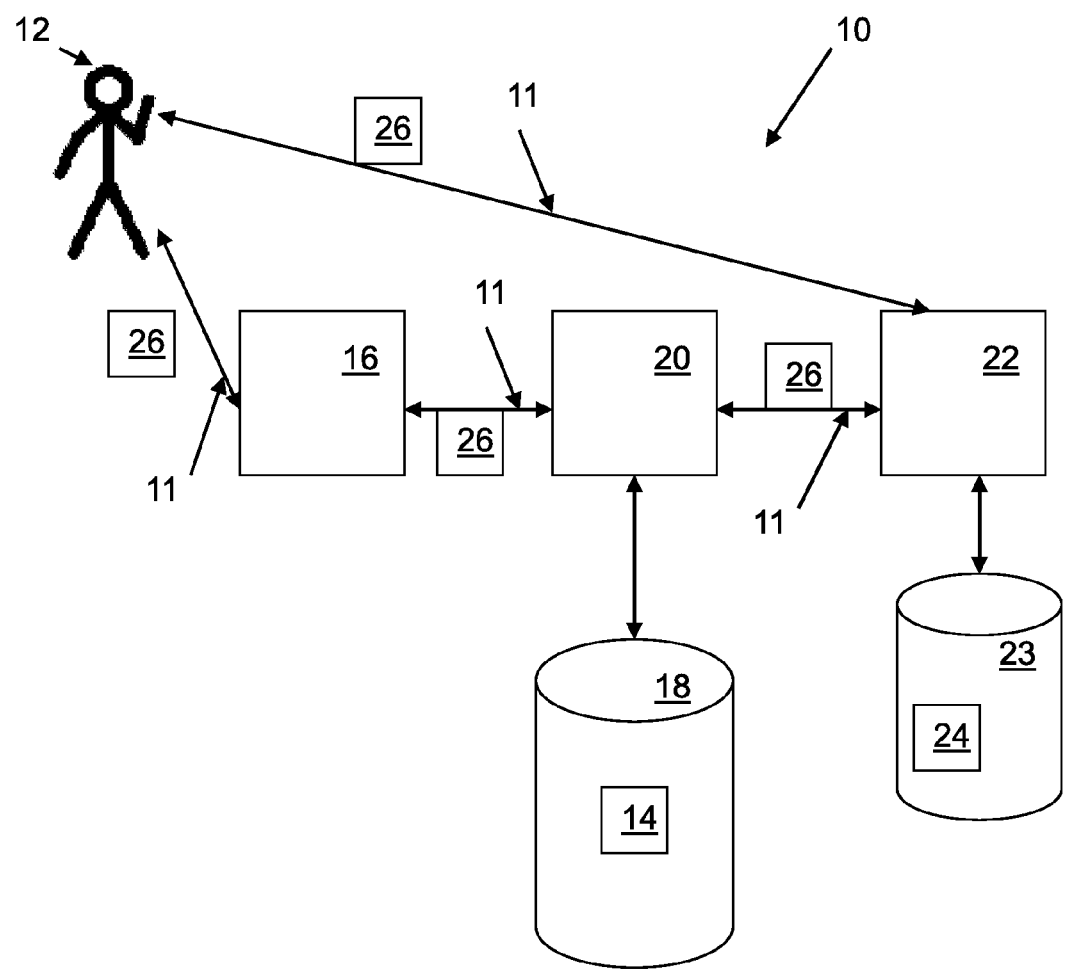
FIG. 1 is a block diagram of components of a domain name registration system.

It is an object of the present invention to provide a system to obviate or mitigate at least some of the above presented disadvantages.

A first aspect provided is a system for providing a directory service for generating web presence pages made available on a network, the system comprising: a computer processor and memory having instructions stored thereon for implementation by the computer processor to: receive registration information of a domain name by a registrant for a specified top level domain; parse the registration information to obtain a set of keywords; search the network using the set of keywords for publically available information about the registrant; create registrant information based on information obtained from the search using the set of keywords; generate a trusted web presence page of the web presence pages to include at least a first portion of the registrant information as read only content with respect to the registrant, such that the registrant is restricted from customizing the read only content; create a link between a profile page and the trusted web presence page of the web presence pages, the link configured for placement on at least one of the web presence pages such that the profile page and the trusted web presence page would be linked to one another, the profile page to include at least a second portion of the registrant information as customizable content with respect to the registrant, such that the registrant is allowed to customize the customizable content; and publish the trusted web presence page on the network.

A second aspect provided is a method for providing a directory service for generating web presence pages made available on a network, the method comprising the steps of: receive registration information of a domain name by a registrant for a specified top level domain; parse the registration information to obtain a set of keywords; search the network using the set of keywords for publically available information about the registrant; create registrant information based on information obtained from the search using the set of keywords; generate a trusted web presence page of the web presence pages to include at least a first portion of the registrant information as read only content with respect to the registrant, such that the registrant is restricted from customizing the read only content; create a link between a profile page and the trusted web presence page of the web presence pages, the link configured for placement on at least one of the web presence pages such that the profile page and the trusted web presence page would be linked to one another, the profile page to include at least a second portion of the registrant information as customizable content with respect to the registrant, such that the registrant is allowed to customize the customizable content; and publish the trusted web presence pages on the network.

A third aspect provided is a system for providing a directory service for generating web presence pages made available on a network, the system comprising: a computer processor and memory having instructions stored thereon for implementation by the computer processor to: receive registration information of a domain name by a registrant for a specified top level domain; receive information about the registrant from a plurality of network users; combine the information as aggregate registrant information representing crowd sourced content of the plurality of network users; generate a trusted web presence page of the web presence pages to include at least a portion of the aggregate registrant information as read only content with respect to the registrant, such that the registrant is restricted from customizing the read only content; create a link between a profile page and the trusted web presence page of the web presence pages, the link configured for placement on at least one of the web presence pages such that the profile page and the trusted web presence page would be linked to one another, the profile page to include customizable content with respect to the registrant, such that the registrant is allowed to customize the customizable content; and publish the trusted web presence page on the network.

A fourth aspect provided is a system for providing a directory service for generating web presence pages made available on a network, the system comprising: a computer processor and memory having instructions stored thereon for implementation by the computer processor to: receive registration information of a domain name by a registrant for a specified top level domain; provide access to information about the registrant to a plurality of network users, the information being aggregate registrant information representing crowd sourced content; receive individual votes from the plurality of network users on the aggregate registrant information for a specified character of the aggregate registrant information; generate a trusted web presence page of the web presence pages to include at least a portion of the aggregate registrant information as read only content with respect to the registrant, such that the registrant is restricted from customizing the read only content; create a link between a profile page and the trusted web presence page of the web presence pages, the link configured for placement on at least one of the web presence pages such that the profile page and the trusted web presence page would be linked to one another, the profile page to include customizable content with respect to the registrant, such that the registrant is allowed to customize the customizable content; and publish the trusted web presence page on the network.

A fifth aspect provided is a system for providing a directory service for generating web presence pages made available on a network, the system comprising: a computer processor and memory having instructions stored thereon for implementation by the computer processor to: receive registration information of a domain name by a registrant for a specified top level domain; parse the registration information to obtain a set of keywords; search the network using the set of keywords for publically available information about the registrant; create registrant information based on information obtained from the search using the set of keywords; generate a trusted web presence page of the web presence pages to include at least a portion of the registrant information as read only content with respect to the registrant, such that the registrant is restricted from customizing the read only content; generate a profile page of the web presence pages, the profile page to include customizable content with respect to the registrant such that the registrant is allowed to customize the customizable content; and publish the web presence pages on the network.

A sixth aspect provided is a system for providing a directory service for generating web presence pages made available on a network, the system comprising: a computer processor and memory having instructions stored thereon for implementation by the computer processor to: receive registration information of a domain name by a registrant for a specified top level domain; receive information about the registrant from a plurality of network users; combine the information as aggregate registrant information representing crowd sourced content of the plurality of network users; generate a trusted web presence page of the web presence pages to include at least a portion of the aggregate registrant information as read only content with respect to the registrant, such that the registrant is restricted from customizing the read only content; create a profile page of the web presence pages, the profile page including customizable content with respect to the registrant such that the registrant is allowed to customize the customizable content; and publish the web presence pages on the network.

A seventh aspect provided is a system for providing a directory service for generating web presence pages made available on a network, the system comprising: a computer processor and memory having instructions stored thereon for implementation by the computer processor to: receive registration information of a domain name by a registrant for a specified top level domain; provide access to information about the registrant to a plurality of network users, the information being aggregate registrant information representing crowd sourced content; receive individual votes from the plurality of network users on the aggregate registrant information for a specified character of the aggregate registrant information; generate a trusted web presence page of the web presence pages to include at least a portion of the aggregate registrant information as read only content with respect to the registrant, such that the registrant is restricted from customizing the read only content; create a profile page the web presence pages, the profile page including customizable content with respect to the registrant such that the registrant is allowed to customize the customizable content; and publish the web presence pages on the network.

DETAILED DESCRIPTION OF THE PREFERRED EMBODIMENT(S)

Referring to FIG. 1, shown is a domain name registration system 10 providing for a domain name registrant 12 (e.g. domain owner) to request and obtain over a communications network 11 a domain name 14 from a domain name registrar 16 for domain name 14 available (e.g. not yet claimed) in a domain name registry 18 (e.g. a database of all domain names registered in a top-level domain (TLD)), which is managed by a registry operator 20 that also generates zone files which represent a lookup of domain names to IP addresses. Registry operator 20 can also interact with a directory subscription service 22 responsible for generating and maintaining web presence pages 24 (e.g. the page(s) 24 can be hosted by the registry operator 22 and/or the directory subscription service 22) associated with domain name 14 obtained by registrant 12. It is recognized that registrant 12 itself can communicate directly with directory subscription service 22 for registration information 26 used in generation of web presence pages 24, and/or can communicate registration information 26 indirectly with directory subscription service 22 via registry operator 20. Further, registry operator 20 can supply any requested registration information 26 to directory subscription service 22 on behalf of registrant 12. As such, once published on network 11, network 11 users can access web presence pages 24 via network 11 and accordingly access content 42,43 (see FIG. 2) of web presence pages 24. An example of such access is the network 11 users using a web browser to navigate on network 11 to web presence pages 24 and display content 42,43 on a user interface of their computer device.

Preferably, the communications network 11 comprises a wide area network such as the Internet, however the network 11 may also comprise one or more local area networks 11, one or more wide area networks, or a combination thereof. Further, the network 11 need not be a land-based network, but instead may comprise a wireless network and/or a hybrid of a land-based network and a wireless network for enhanced communications flexibility. For example, the communications network 11 can also include Bluetooth™ associated elements. It is recognised that domain name registrar 16, registry operator 20 and directory subscription service 22 can be implemented on computer devices 100 (see FIG. 3) such as servers and can communicate with one another via the network 11 in client-server relationships.

In general, a domain name is an identification string that defines a realm of administrative autonomy, authority, or control on the Internet, whereby domain names are formed by the rules and procedures of a Domain Name System (DNS). Domain names are used in various networking contexts and application-specific naming and addressing purposes, as an Internet Protocol (IP) resource, such as a personal computer used to access the Internet, a server computer hosting a web site, or the web site itself or any other service communicated via the Internet. Domain names are organized in subordinate levels (subdomains) of the DNS root domain, which is nameless. The first-level set of domain names are the TLDs. Below these TDLs in the DNS hierarchy are the second-level and third-level domain names that are typically open for reservation by end-users who wish to connect local area networks to the Internet, create other publicly accessible Internet resources or run web sites. There can be fourth- and fifth-level domains, and so on, with virtually no limitation. The registration of these domain names is usually administered by domain name registrars 16 who sell their services to the public (i.e. registrants 12). Individual Internet host computers can use domain names as host identifiers, or hostnames. Hostnames can be defined as the leaf labels in the domain name system usually without further subordinate domain name space and can appear as a component in Uniform Resource Locators (URLs) for Internet resources such as web sites having one or more web pages. Domain names can also be used as simple identification labels to indicate ownership or control of a resource, such as realm identifiers used in the Session Initiation Protocol (SIP), DomainKeys used to verify DNS domains in e-mail systems, and in many other Uniform Resource Identifiers (URIs). For example, the domain name can be a component of a (URL) used to access web sites, for example: URL—http://www.example.info/index.html, Top-level domain name: info, Second-level domain name: example.info, Host name: www.example.info.

Domain name 14 can consist of one or more parts, technically called labels, that are conventionally concatenated, and delimited by dots, such as example.info. The right-most label conveys the TLD, for example, the domain name www.example.info belongs to the TLD info. The hierarchy of domains descends from the right to the left label in the name; each label to the left specifies a subdivision, or subdomain of the domain to the right. For example: the label example specifies a node example.info as a subdomain of the info domain, and www is a label to create www.example.info, a subdomain of example.info. A hostname is a domain name that has at least one associated IP address. For example, the domain names www.example.info and example.info are also hostnames, whereas the info domain is not. However, other TLDs, particularly country code top-level domains, may indeed have an IP address, and if so, they are also hostnames. It is recognized that hostnames can impose restrictions on the characters allowed in the corresponding domain name. A valid hostname is also a valid domain name, but a valid domain name may not necessarily be valid as a hostname.

Referring again to FIG. 1, domain name registry 18 contains those domain names that are registered for a specific TLD, which is one of the domains at the highest level in the hierarchical Domain Name System (DNS) of the Internet. Practically speaking, TLD names are installed in a root zone of the name space for the TLD and for all domains in lower levels, the TLD is the last part of the domain name, that is, the last label of a fully qualified domain name. It is recognized that there can be a number of different TLD types, such as but not limited to: country-code top-level domains (ccTLD) consisting of two letter domains established for countries or territories; internationalized country code top-level domains (IDN ccTLD) which are ccTLDs in non-latin character sets (e.g., Arabic or Chinese) which are displayed in end-user applications in their language-native script or alphabet but use a Punycode-translated ASCII domain name in the Domain Name System; generic top-level domains (gTLD) which are top-level domains with three or more characters (e.g. GOV, EDU, COM, MIL, ORG, NET and INFO) including unsponsored top-level domains which are domains that operate directly under policies established for the global Internet community and sponsored top-level domains (sTLD) that are proposed and sponsored by private agencies or organizations that establish and enforce rules restricting the eligibility to use the TLD; and infrastructure top-level domain that is one domain, the Address and Routing Parameter Area (ARPA) managed on behalf of the Internet Engineering Task Force for various purposes specified in the Request for Comments publications.

Domain names 14 can be formed from the set of alphanumeric ASCII characters (a-z, A-Z, 0-9), but characters are case-insensitive. In addition the hyphen can be permitted if it is surrounded by a characters or digits, i.e. it is not the start or end of a label. Labels are separated by the full stop (period) character in the textual name representation. It is recognized that the membership names 14 can be represented using characters based in other languages as well, including alternate formats as appropriate, as desired.

Figure 2:
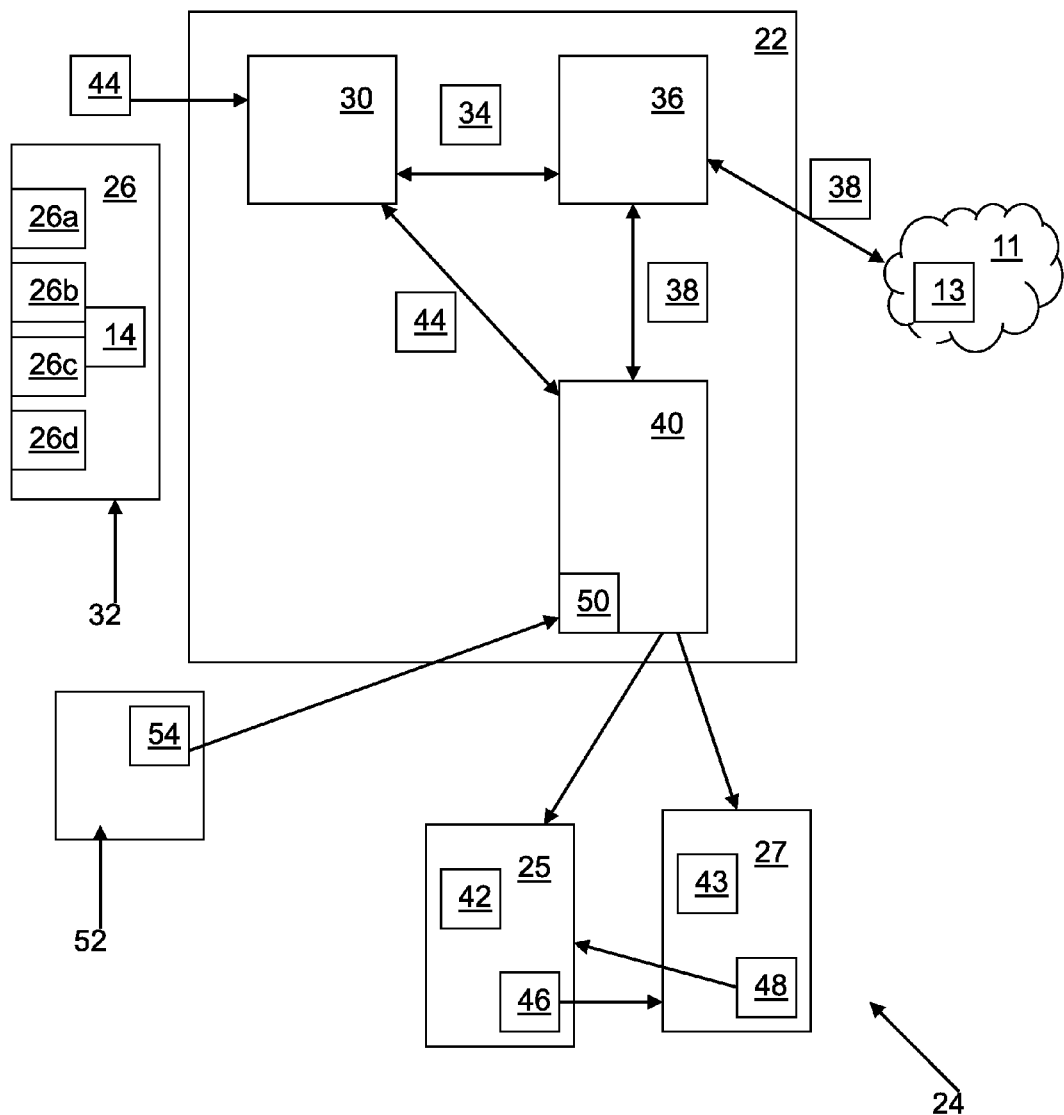
FIG. 2 is a block diagram of an example directory subscription service for the system of FIG. 1.

Referring to FIGS. 1 and 2, shown is directory subscription service 22 responsible for generation of web presence pages 24, which are accessible via a specified URI (over the network 11) incorporating the domain name 14 associated with the specified TLD maintained in domain name registry 18 using an appropriate network communications protocol (e.g. TCP/IP, HTTP, HTTPS, etc.). For example, the network communications protocol includes rules for data formats for data exchange and rules for network address formats for data exchange that identify both the sender network 11 address and the intended receiver(s) network 11 address. In computing, the URI is a string of characters used to identify a name or a resource. Such identification enables interaction with representations of the resource over a network (typically the World Wide Web) using the specific protocols. Schemes specifying a concrete syntax and associated protocols define each URI, such that URIs can be classified as locators (URLs), as names (URNs), or as both. A uniform resource name (URN) functions like a person's name, while a uniform resource locator (URL) resembles that person's street address. In other words: the URN defines an item's identity, while the URL provides a method for finding the item over the network 11.

From the point of view of a visitor to web presence pages 24, the content (e.g. content 42 and content 43) of web presence pages 24 will be perceived by the visitor as an uber-social media site and trusted source of information (e.g. trusted web presence page(s) 25). The objective of web presence pages 24 is to provide a trusted one-stop source for links and access to information and services about a domain name's registration. For registries focused on organizational registrations, the directory subscription service 22 can offer effective and significant brand protection to registrant 12 (e.g. organization) of domain name 14. This is especially valuable to small and medium sized organizations, as well as organizations with limited resources to develop and manage a brand. Web presence pages 24 provided by directory subscription service 22 can provide a jumping off platform to external details of registrant 12 that can mitigate phishing and abuse attacks if it is always used as a starting point of contact on network 11.

It is recognized that the directory subscription service 22 provides or otherwise hosts the web presence pages 24 made available to users of the network 11, in order to provide access to web-published content associated with the domain name of interest sought by the network user. For example, the web presence pages 24 and associated content can be provided to the network 11 by the directory subscription service 22 as files uploaded via File Transfer Protocol (FTP) or a Web interface of the network 11 (e.g. the Internet). The files representing the web presence pages 24 can be delivered to the Web "as is" or with some processing. The web presence page(s) 24 for a domain name registrant 12 (e.g. domain owner) can be provided as a single page hosted or as a more complex series of pages and associated navigational links between the pages supported via the database and application development platforms (e.g. PHP, Java, Ruby on Rails, ColdFusion, or ASP.NET). However, it is recognized that the application development platforms, when pertaining to content of their web presence pages 24, inhibits the domain name registrant 12 (e.g. domain owner) from writing or installing scripts for applications like forums and content management published on the web presence pages 24, as further described below. As such, the directory subscription service 22, for any content published on the web presence pages 24, provides none or limited interfaces or control panels to the domain name registrant 12 (e.g. domain owner) for managing the Web server and installing scripts, as well as other modules and service applications like e-mail, as the permanent information (content 42 and/or content 43) is perceived by users of the network 11 as independent or trusted information about the domain name registrant 12 that is independent from manipulation of any substantive portions of the content 42,43 that is considered as trusted content (registrant information 38 generated and published on the trusted web presence page(s) 25) as further described below.

The data model for content 42 and content 43 can have a number of different classifications of information, e.g. permanent, transient, and/or temporal). Permanent information (content 42 and/or content 43) is data that is discovered and imported directly to a local database 23 of directory subscription service 22. An example of this type of data is the registration information 26. For example, permanent information that is physically stored in database 23 can be updated periodically (e.g. daily), confirmed to help ensure accuracy and completeness. Transient information (content 42 and/or content 43) is data that is acquired when needed. An example of this type of data is a news feed. Temporal information (content 42 and/or content 43) is data that stored in the local database 23 but is only retained for a specific period of time, after which the information is removed.

Further, it is recognized that directory subscription service 22 can be embodied as separate from registry operator 20 (e.g. a third party cooperating with registry operator 20 via the network 11) or can be embodied as a service hosted (not shown) by registry operator 20 itself, as desired. Directory subscription service 22 generates web presence pages 24 based on registration information 26 obtained from the registry operator 20 and/or registrant 12, as received via a registration module 30 as a subscription request 32.

Example content of registration information 26 can include several pieces of information connected with the domain name 14, for example: 1) administrative contact information 26*a* (e.g. contact name, address, etc.) defining a designated administrative contact to manage the domain name 14 including management of all business information, such as name of record, postal address, and contact information of the official registrant of the domain name 14 and the obligation to conform to the requirements of the domain registry 18 in order to retain the right to use the domain name 14, as well as installing additional contact information for technical and billing functions; 2) technical contact information 26*b* (e.g. contact name, address, etc.) defining a designated technical contact to manage the name servers of the domain name including assuring conformance of the configurations of the domain name 14 with the requirements of the domain registry 18, maintaining the domain zone records, and providing continuous functionality of the name servers (that leads to the accessibility of the domain name 14); 3) billing contact information 26*c* (e.g. contact name, address, etc.) defining a designated party responsible for receiving billing invoices from the domain name registrar 16 and paying applicable fees; and 4) name servers information 26*d* (e.g. a hostname and the corresponding IP address or just the hostname, which must be resolvable either in the new domain name 14, or exist elsewhere) defining designated two or more name servers as part of the registration service, for example registrant 18 can specify its own authoritative name servers to host the domain's resource records.

Registration module 30 parses subscription request 32 of registration information 26 to reduce registration information 26 to a set of keywords 34 provided to a search module 36 that will be used to search network 11 for registrant information 38 relevant to keywords 34. Registrant information 38 can be obtained from network 11 in general without restriction and/or can be obtained from specified sources 13 (trusted information sources that are unbiased towards registrant 12, examples of such would be sources independent from registrant 12 such as social media sources and/or news feed sources) accessible via network 11. As registrant information 38 is found, it is provided to a page generation module 40 for use in generating web presence pages 24.

It is recognized that the process of obtaining registrant information 38 relevant to keywords 34 by search module 36, and generation/amendment of content 42 of web presence pages 24, can be implemented on an ongoing basis as long as domain name 14 is subscribed. In one embodiment, operationally, search module 36 actively seeks public information available on network 11 about domain name 14 registration on an ongoing basis. This can be accomplished through automated network crawlers that seek out and maintain the timeliness of identified registrant information 38 on a defined periodic basis such as daily, by example. Additionally or alternatively, search module 36 can be configured to receive notifications containing registrant information 38 from third party information suppliers (e.g. Google™ alerts, Facebook™ alerts, etc.). It is also recognized that, optionally, content 42 of trusted web presence page(s) 25 can be generated to include additional private information from private sources (i.e. information not publically available on network 11).

A network (e.g. web) crawler is a computer program that browses the network in a methodical, automated manner or in an orderly fashion. This process of network browsing for registrant information 38 is called network crawling or spidering. Spidering can be used as a means of providing up-to-date data for registrant information 38. Network crawlers are mainly used to create a copy of all the visited network content (e.g. pages) for later processing that will index the downloaded network content to identify relevant registrant information 38 for use as updating or otherwise adding to content 42 of web presence pages 24. A Web crawler is one type of bot, or software agent. In general, it starts with a list of URLs to visit, called the seeds. As the crawler visits these URLs, it identifies all the hyperlinks in the page and adds them to the list of URLs to visit, called the crawl frontier. URLs from the frontier are recursively visited according to a set of policies.

As such, the content 42 can represent data content that is part of a web page, data content that is linked to the web page via network 11 navigational mechanisms (e.g. hyperlinks), data content that is part of DNS resolution support architecture of the web page, etc. It is also recognized that the content 42 can contain information concerning indicators of high or low significance, for example the number of network 11 information sources other than the web presence pages 24 containing similar content 42, number of or type of network 11 sources relied upon to gather the page content 42, etc. It is also recognized that spatial positioning of the content 42 on the web presence pages 24 can be used to signify degree of relevance and conventional viewpoints of a community (e.g. peers, customers, competitors, etc.) associated with the content 42 displayed on or otherwise linked to the web presence pages 24. For example, top and center positioned content 42 information on the web presence pages 24 can be considered as implicitly contained a network 11 level popular viewpoint (greater frequency of occurrence on other network 11 content outside of the web presence pages 24) of the registrant's company/business/service quality, etc.

Examples of registrant information 38 can include information such as but not limited to: public information about the registrant 12 available on the network 11; news feeds; references to external web sites; blog entries; social media content from social media sites (e.g. Facebook, LinkedIn, and Twitter); content from trusted sources that are independent from registrant 12 or are otherwise considered as unbiased towards registrant 12; and any other information that can be acquired regularly and in a uniform format. Unbiased can be defined as free from bias, free from all prejudice and favoritism, eminently fair, and/or having views that include both positive and negative aspects towards registrant 12, etc. Independent can be defined as an individual or organization that is unaffiliated with registrant 12.

For example, network crawlers can be used to gather specific types of registrant information 38 from visited network content, in order to collect public information about a registration, organize it, and display it on a trusted web presence page(s) 25 of web presence pages 24. Trusted web presence page(s) 25 is defined as one or more base pages from which all other services and tools offered by directory subscription service 22 can be accessible via links (e.g. hyperlinks) present on the trusted web presence page(s) 25 that can be accessed by network 11 users to navigate to other web content associated with the other web presence pages 24 (or other pages connected thereto). In one embodiment, the public information obtained from network 11 in registrant information 38 is displayed as content 42 as is on trusted web presence page(s) 25, such that registrant 12 of domain name 14 containing content 42 will have inhibited control over the public information that is collected and displayed on the trusted web presence page(s) 25. In this manner, customization module 50 of page generation module 40 restricts (e.g. inhibits) customization of content 42 by registrant 12. The provision of trusted web presence page(s) 25 of web presence pages 24 provides to visitors a trusted and organized display of information about domain name 14 registration (and registrant 12) and services with which to interact with registrant 12 (or designee).

Registrant information 38 can be obtained from network 11 in general without restriction and/or can be obtained from specified sources 13 (trusted information sources that are unbiased towards registrant 12, examples of such would be sources independent from registrant 12 such as social media sources and/or news feed sources) accessible via network 11. Trusted web presence page(s) 25 has content 42 that is generated by from registrant information 38 provided by search module 36. Search module 36 can include a network 11 search algorithm (e.g. network spider as discussed above).

It is also recognized that search module 36 can be configured to implement crowd sourced content as registrant information 38, such that specified sources 13 can include a plurality of network 11 users (The Crowd) who can present their registrant information 38 content to the search module 38 and optionally grade or otherwise vote on registrant information 38 content of other participants of the Crowd. Crowd sourcing of registrant information 38 by search module 38 can be defined as a process of obtaining registrant information 38 by soliciting individual contributions from a large group of people (i.e. network 11 users considered as an online community of the network 11). Crowd sourced registrant information 38 represents combined efforts of numerous self-identified network 11 users, where each contributor, acting on their own initiative, adds a portion of registrant information 38 that combines with those of other network users 11 to achieve an aggregate registrant information 38 that is included in content 42. It is recognized that aggregate registrant information 38 can be obtained by search module 36 as: a result of direct solicitation (e.g. an information request sent by search module 36 over network 11 and received by particular network 11 user(s) who submit registrant information 38 in response back to search module 36); a result of voluntarily contributed content (e.g. information sent to search module 36 over network 11 by particular network 11 user(s) who submit registrant information 38 to search module 36); and/or a combination thereof. It is also recognized that aggregate registrant information 38 can include content obtained by the network crawler from publically available network content (e.g. blog content of network 11 user(s)) matching one or more key search terms utilized by the network crawler as specified by search module 36.

As such, one form of registrant information 38 is an aggregate of content obtained from a plurality of network 11 users specified as belonging to the Crowd by the search module 36. For example, a Crowd category of specified users 13 can be those network 11 users that remain unsubscribed to subscription service 22. For example, a Crowd category of specified users 13 can be those network 11 users that are subscribed to subscription service 22. In any event, it is recognized that network 11 users specified as belonging to the Crowd are regarded as sources independent from registrant 12. The Crowd is considered an umbrella term for the network 11 users who contribute to aggregate registrant information 38, such that network users 11 are identified as belonging (i.e. a Crowd content category) to the Crowd by the search module 36.

Demographic data (e.g. representative identification information each of network 11 user of the Crowd) can be collected by the search module 36 and associated with the aggregate registrant information 38, such that demographic data can be combined as part content 42 included in trusted web presence page(s) 25. For example, demographic data can include: identification of network 11 user gender; age; geographical region domicile; profession; employment status, marital status, citizenship, specified organization(s) membership; member of subscription service 22 or not, education level, nationality, religion, and/or ethnicity, for example. Demographic data collected by search module 38 of the community of network 11 users associated with aggregated registrant information 38 can be included in content 42 displayed on trusted web presence page(s) 25. The demographic data can be provided actively by the network 11 user(s) in combination with their submitted registrant information 38 content to search module 36 and/or can be obtained by search module 36 separate from (the network 11 user is previously known to search module 36—e.g. in a registration database of subscription service 22) the submission of the network 11 user of registrant information 38 content to search module 36.

Further, registrant information 38 (e.g. collected external to Crowd sourcing) and/or aggregate registrant information 38 (e.g. collected by Crowd sourcing) can be voted on by network 11 users. The voting process can be coordinated by search module 36 by notifying the network 11 users of registrant information 38 or aggregate registrant information 38 available for evaluation through a formal voting process. Through the formal voting process (i.e. Crowd Voting), search module 36 can gather and summarize a large group's (e.g. plurality of the network 11 users) opinion and judgment on a specified registrant information 38 and/or aggregate registrant information 38. As such, it is recognized that collected votes (by search module 36) from the network 11 users can pertain to aggregate registrant information 38 containing content provided by the network 11 users voting on the aggregate registrant information 38. Alternatively, it is recognized that collected votes (by search module 36) from the network 11 users can pertain to aggregate registrant information 38 that is independent (e.g. does not contain) content provided by the network 11 users voting on the aggregate registrant information 38. Alternatively, it is recognized that collected votes (by search module 36) from the network 11 users can pertain to registrant information 38 that is independent (e.g. does not contain) content provided by the network 11 users voting on the aggregate registrant information 38, in other words registrant information 38 being voted on contains content from specified sources 13 other than the network 11 users voting on the registrant information 38.

An example voting process coordinated by search module 36 can be as follows: 1) receive content pertaining to registrant information 38; solicit voting (e.g. send each of the network 11 users a voting request over network 11, post on web presence pages 24 or other pages of subscription service 22 the content of registrant information 38 for voting for subsequent access by network 11 users interested in providing opinion on the posted registrant information 38 available for vote) from a plurality of network 11 users on a specified (by search module 36) character of registrant information 38; receive a plurality of votes on the content pertaining to registrant information 38 from a plurality of the network 11 users; and tally the plurality of votes. Search module 36 could further compare the vote tally against a predefined vote threshold (e.g. stored in storage 23). A result of the comparison (e.g. matching or not the threshold) could be presented to the network 11 of users over network 11. Alternatively or in addition to, the result of the comparison could be used by search module 36 as a decision making tool to incorporate registrant information 38 into content 42 or not. For example, if the result of the comparison is that the registrant information 38 does not satisfy the predefined vote threshold then the registrant information 38 voted on would be excluded from content 42. For example, if the result of the comparison is that the registrant information 38 does satisfy the predefined vote threshold then the registrant information 38 voted on would be included in content 42. Further, it is also recognized that search module 36 could receive or otherwise solicit voting on content already included in content 42, i.e. content available on trusted web presence page(s) 25 by network 11 users via subscription service 22.

In terms of the specified character of registrant information 38, the character could be selected from character types such as but not limited to: veracity of registrant information 38; accuracy of registrant information 38; representativeness of registrant information 38 with domain name registrant 12; and/or relevancy of registrant information 38 to domain name registrant 12. For example, registrant information 38 can include organizational history (e.g. specified geographic regions of registrant influence, specified activities, level/degree of involvement with other external organizations, etc.) of registrant 12. The predefined vote threshold could be a numerical quantity, for example number of votes supporting the specified character of less than X % means that the registrant information 38 voted on is considered as non-relevant to the domain name registrant 12. As provided above, the content voted on can be aggregate registrant information 38 that is dependent (e.g. does contain) content provided by the network 11 users voting on as aggregate registrant information 38. As provided above, the content voted on can be registrant information 38 that is independent (e.g. does contain) content provided by the network 11 users voting on as registrant information 38. As provided above, the content voted on can be aggregate registrant information 38 that is independent (e.g. does not contain) content provided by the network 11 users voting on as aggregate registrant information 38. As such, it is recognized that subscription service 22 administers the voting process, e.g. via search module 36 or any other appropriately configured module of subscription service 22, such that subscription service 22 is responsible for providing registrant information 38 (e.g. aggregate registrant information 38) for access by the network 11 users for voting as well as collecting the individual votes and subsequent processing of the votes and resulting action(s) pertaining to the registrant information 38.

It is recognized that the results of the vote could be included in content 42 and thus associated with registrant information 38 (e.g. aggregate registrant information 38) for display on trusted web presence page(s) 25. It is recognized that the results of the vote could be included in content 43 of profile page(s) 27 and thus associated with any content voted on for display on profile page(s) 27.

Trusted web presence page(s) 25 has content 42 that is generated by page generation module 40 from registrant information 38 identified by search module 36. Page generation module 40 and search module 36 cooperate to collect public information about a registrant and their domain name 14, organize it, and include it as content 42 for display on trusted web presence page(s) 25. Trusted web presence page(s) 25 has content 42 that is trusted by visitors because content 42 can be protected using industry standard best practices (e.g. protecting the domain name's DNS service using DNSSEC and protecting the web site using TLS (HTTPS)), or otherwise restricting access to the database contents of the registry 18 to specified database administrators).

Content 42 being trusted is an important element because it will provide assurance to visitors of trusted web presence page(s) 25 of the quality and provenance of the information contained within content 42. For example, content 42 can contain information that is "read only" by registrant 12 and therefore provides a true representation or picture of registrant 12 as perceived by various sources publically available on the network 11. As such, content 42 contains read-only information (with respect to registrant 12) that is an aggregation of unbiased and/or independent information obtained from network 11. In this manner, page generation module 40 restricts any customization (e.g. write ability) of content 42 by registrant 12 while at the same time allows customization of content 43 of profile page 27 by registrant 12, as further discussed below.

In terms of trusted web presence page(s) 25, read-only content 42 can be information such as but not limited to: (a) Subscriber contact information—this can be pre-seeded with the administrative contact information from the registration data; (b) Registration information—this will be a display of the information commonly available from a Whois query; (c) About information—if a domain name 14 site has an external web site (1 or more) associated with it and the "about page" for the external web site can be identified, then information from that page can be included; (d) Images slide show—if a domain name 14 site has an external web site (1 or more) associated with it, images from the site can be collected and available to visitors of the domain name 14 site as a slide show; (e) News feed—based on the keywords and category associated with registrant 12, one or more external news sources can be consulted to provide a news feed both directly and indirectly related to registrant 12; social media information—based on the keywords and category associated with registrant 12, one or more social media information sources can be consulted to provide social media information both directly and indirectly related to registrant 12; and/or (f) Map—based on the subscriber contact information a map can be created marking the geographical location of registrant 12 that can include physical address and contact information (e.g. including getting directions to the location).

Further to the above, in one embodiment registrant 12 can submit feedback/comment messages 44 containing "agree" and/or "disagree" statements for selected portions of registrant information 38 to module 30, for subsequent association and incorporation with the respective selected portions of registrant information 38 in content 42 of trusted web presence page(s) 25. This mechanism of comment can advantageously provide registrant with the ability to present their view of "read-only" content 42 as perceived by visitors. For example, in the case where an untrue (as considered by registrant 12) defamatory statement about registrant 12 is included in social media information incorporated in registrant information 38, registrant has the ability to provide their own comments towards the defamatory statement, thereby reinforcing the unbiased and trusted nature of content 42 as perceived by visitors. In this manner, the read-only content cannot be modified by registrant 12, however page generation module 40 can be configured to receive feedback/comment messages 44 and post the feedback/comment messages 44 along side (or otherwise associated) the unamended content 42, i.e. feedback/comment messages 44 are displayed concurrently with the read-only content 42 such that the information contained within content 42 remains unchanged by the addition of feedback/comment messages 44 with content 42. Accordingly, in view of the above, content 42 of trusted web presence page(s) 25 can provide for an aggregation of periodically updated public information about registrant 12 that is distributed over a number of sources on network 11, thus providing a visitor convenient site for accessing unbiased and/or independent information about registrant 12.

In terms of implementation of trusted web presence page(s) 25 by directory subscription service 22, trusted web presence page(s) 25 can be accessible via the appropriate URI for the network 11 in a number of different forms. In one embodiment, with respect to a URL for trusted web presence page(s) 25, the preferred choice is for the URL to be a three level domain (3LD), e.g., domain-name.IntDir.TLD, such that "IntDir" represents network 11 addressing for directory subscription service 22. In this configuration the SLD can be delegated to registrant 12 such that the registrant can use domain-name.TLD according to their own wishes. An alternate choice for the URL is for the registry operator 20 to decide that directory subscription service 22 is the purpose of the domain name and thus it should be an SLD, e.g., domain-name.TLD. The distinction here is that the SLD is not delegated to registrant 12. Since the registry operator 20 hosts trusted web presence page(s) 25, the SLD will be delegated to directory subscription service 22 just as it would be in the 3LD choice. A potential disadvantage to this alternative is that it could be impractical to return the registry to the typical configuration of having the SLD delegated to registrant 12.

It is recognized that if some of registrant information 38 is not available on network 11, then an indication of its unavailability will be included in content 42 for display as such on trusted web presence page(s) 25.

It is recognized that registration information 26 can be provided to module 30 independently from registrant 12 (e.g. by registry operator 20), such that registrant 12 is not a subscriber to directory subscription service 22. In this case, web presence pages 24 would consist of trusted web presence page(s) 25 and not a profile page 27 (further described below). Accordingly, only in the event of subscription by registrant to directory subscription service 22 would profile page 27 be created and linked to trusted web presence page(s) 25. The following terminology is used to describe elements of web presence pages 24 and their creation, namely: Registrant 12—the standard definition of this term in a domain name life cycle is used, i.e. it is the party who requested the creation of the domain name 14 registration in the domain name registry 18; Subscriber—a subscriber is registrant 12 that has opted-in their domain name 14 to directory subscription service 22; Claimant—a claimant is a subscriber that is expressly associated with a party who will manage the subscription of domain name 14 with directory subscription service 22; and Visitor—a visitor is any party who interacts with any element (e.g. web presence pages 24) of directory subscription service 22 over network 11, for example using a network browser of their computer device.

As such, the trusted web presence page(s) 25 contains content 42 that is aggregated and generated by page generation module 40 from registrant information 38 identified by search module 36, which can include registrant information obtained via the public information sources on the network 11 which is of an independent nature/influence by the registrant. Page generation module 40 and search module 36 cooperate to collect public information about a registrant and their domain name 14, organize it, and include it as content 42 for display on trusted web presence page(s) 25. Trusted web presence page(s) 25 has content 42 that can be trusted by visitors because content 42 being trusted can provide assurance to visitors of trusted web presence page(s) 25 of the quality and provenance of the information contained within content 42. As such, network 11 navigational links present on the trusted web presence page(s) 25 can be relied upon by the network 11 user to navigate to other network 11 pages (e.g. profile page 27 linked to the trusted web presence page(s) 25) that can be considered as appropriate and contain content provided by and attributable to the registrant (i.e. owner) of the web presence pages 24. In other words, the network 11 user can rely upon page content and navigable links of the web presence pages 24 with respect to information accuracy and navigational security considerations.

Referring again to FIG. 2, web presence pages 24 can also include profile page(s) 27, such that trusted web presence page(s) 25 and profile page(s) 27 are directly linked to one another via web page navigational mechanisms such as hyperlinks. As such, it is recognized that any web page navigational mechanisms on the trusted web page(s) 25 can be advantageously used by a network 11 user navigate to other pages (e.g. profile page(s) 27) considered trusted as containing web page content sanctioned as appropriate and accurate by the registrant 12 of the web presence pages 24. A profile page related to a trusted web presence page(s) can be obtained by a registrant upon subscription to directory subscription service 22. For example, profile page(s) 27 could contain a link 48 that when accessed directs the visitor to trusted web presence page(s) 25 and/or trusted web presence page(s) 25 could contain a link 46 that when accessed directs the visitor to profile page(s) 27. In this manner, visitor can be assured that profile page(s) 27 is associated with the read-only information content 42 resident trusted web presence page(s) 25 and vice versa. As such, utilization of the web presence pages 24 by the registrant 12, as either the only web published content for the registrant, or as part of a larger collection of web pages published by the registrant 12, to serve web content to network 11 users can advantageously provide the network 11 users with some assurance that the web content as well as any web functionality of the web pages is trustable and actually sanctioned by the registrant 12. This advantage of trustworthiness is considered important in today's world of numerous websites and content that can be false or otherwise malicious in nature.

Profile page(s) 27 includes interactive services and features (as content 43) as provided or otherwise enabled by directory subscription service 22. Registrant 12 operating as a claimant can enable and disable (e.g. customize) portions of services and features (i.e. content 43) of profile page(s) 27, which is different as compared to the read-only interaction they have with content 42 of trusted web presence page(s) 25. Therefore, contrary to the content of the trusted web presence page(s) 25, application development platforms pertaining to content of their web pages 27 provides to the domain name registrant 12 (e.g. domain owner) writing or installing scripts for applications like forums and content management published on the web pages 27, as further described below. As such, the directory subscription service 22, for any content published on the web pages 27, provides interfaces or control panels to the domain name registrant 12 (e.g. domain owner) for managing the Web server and installing scripts, as well as other modules and service applications like e-mail. The customization of content 43 can be provided by registrant 12 through customization messages 52 (containing additional content 54 and/or customization instructions 54) sent by registrant 12 to customization module 50 for use in dynamically updating content 43 of their profile page(s) 27.

Interactive services/features as content 43 are such that registrants 12 can specify additional content 54 and/or customization instructions 54 such as social media "like" and "follow" links, e.g., Facebook, LinkedIn, and Twitter as the content of profile page(s) 27. Additional content 54 and/or customization instructions 54 can be chat services included in interactive services/features so that visitors to profile page 27 can select a "live person" with whom to communicate regarding the web site represented by profile page 27. In terms of organizations involved with payment, additional content 54 and/or customization instructions 54 can be payment services made available so that visitors can direct funds to registrant 12. Further, profile page 27 can include additional content 54 and/or customization instructions 54 for services/features (e.g. email groups, search functions within the TLD of domain name 14, etc.) that provide for registrants 12 themselves to have a means to get introduced and self-organize with other similar or related registrants 12. The content 43 (e.g. Additional content 54 and/or customization instructions 54) listed above are presented as examples and expressly do not limit the services and functionality to be explored and included in profile pages 27.

The profile pages 27 contain customizable content (i.e. services and features as content 43) that is provided by registrant 12 in messages 52 to directory subscription service 22 for interaction with visitors to their profile page 27. The content 43 can also include customizable content (e.g. in format and/or content and/or positional placement on their profile page 27) for: basic information regarding registrant 12 (e.g. in terms of an organization—their name, what they do, etc.); possible information from licensing organizations (or proof of verification); content and functionality similar to a social media (e.g. Facebook™) page for organization/group (one liner with status), which can be as simple as a direct link to a third party hosted social media page (facebook.com/domain-name.TLD) of the registrant to actually including content reposted from the third party hosted social media page; multimedia (photos, video, etc) obtained as content 43 obtained or otherwise sourced from registrant 12; basic static information of registrant 12 (logo, contact, external website, etc) such that registrant has control over the format and/or content of the static information; donation mechanisms (in the case of charitable organizations); news or update activities (text or media, feeds, etc.) of registrant 12 as specified or otherwise uploaded by registrant 12 to directory subscription service 22 for presentation on profile page 27 of registrant 12; ability to provide direct links by registrant 12 in order to share third party hosted social media content via their profile page 27; and/or searchable entries within the TLD of profile page 27; social media linking (with button to add to expand) (e.g. Twitter™ feed, Facebook™, Flickr™, LinkedIn™).

It is also recognized that any web page navigation mechanisms (e.g. hyperlinks) included in the profile page(s) 27 can be added or amended by the registrant 12 using the web page 27 development tools as provided by the hosting server of the profile page 27. However it is noted that any navigational mechanisms of the profile page 27 linked to the trusted web page(s) 25 is provided as read only by the registrant 12. As such, similar to the trusted web page(s) 25 content, any navigation mechanisms linking to or from the trusted web page(s) 25 is also considered as permanent or otherwise trusted "content", thereby providing the network 11 user with a sense of trustworthiness for any web page navigation functionality leading to or from the trusted web page(s) 25.

It is recognized that profile page 27 can have a common template layout that can be pre-populated by generation module 40 using registrant information 38 as a starting point for content 43 from which registrant 12 can customize via customization module 50. Further, registrant 12 can augment content 43 using registrant 12 submitted tags and/or categorization of content 43 to customization module 50. Accordingly, registrant 12 has some limited control via customization module 50 over the information in content 43 that is displayed and can have access to enable and disable a number of additional services/features of content 43.

In an alternative embodiment, it is not required for a trusted web presence page(s) 25 to be claimed by registrant 12 through directory subscription service 22. However, in the case where registrant 12 is a claimant, once trusted web presence page(s) 25 is claimed registrant 12 (acting as claimant of trusted web presence page(s) 25) can then have some limited control over the information in content 43 that is displayed and can have access to enable and disable a number of additional services/features of content 43. In addition, the claimant can have access to a variety of statistics, alerts, and notifications to help them manage how their profile page 27 is perceived by the community-at-large. This ability for registrant 12 acting as claimant to customize or otherwise have access to their profile page 27 is dependent upon registrant claiming their trusted web presence page(s) 25.

One example is profile page 27 is generated with pre-populated information derived from registrant information 38 prior to registrant 12 claiming their trusted web presence page(s) 25, however customization of their profile page 27 is restricted (not allowed) by customization module 50 until after registrant 12 claims their trusted web presence page(s) 25. In a different example, profile page 27 is not generated (i.e. does not exist or is otherwise not available via the network 11) with pre-populated information derived from registrant information 38 prior to registrant 12 claiming their trusted web presence page(s) 25. Upon claiming their trusted web presence page(s) 25 (e.g. via registration or subscription to directory subscription service 22 by registrant 12), page generation module 50 would use registrant information 38 to pre-populate content 43 of their profile page 27 and also allow customization of content 43 of profile page 27 by registrant 12 (e.g. through customization module 50) as a result of registrant 12 claiming their trusted web presence page(s) 25. It is recognized that web content can include multi-media content as well as inter-web page navigation mechanisms/functionality.

As such, network 11 navigational links present on the profile page 27 can be relied upon by the network 11 user to navigate to other network 11 pages (e.g. other websites associated with the registrant's business/service offerings, other websites associated customers of the registrant amongst others that are part of the community(ies) of which the registrant belongs, designated/directed network 11 content compatible with the registrant's business and community viewpoint(s), etc.) that can be considered as appropriate and contain content associated with, provided by and/or attributable to the registrant (i.e. owner) of the web presence pages 24. In other words, the network 11 user can rely upon page content and navigable links of the profile pages 27 with respect to information accuracy, information relevancy, and/or navigational security considerations, as defined by the registrant 12, as defined by the registrant 12.

Web Navigation

Web navigation can be defined as a process of navigating a network of information resources (e.g. web presence pages 24 as well as pages stemming to and from the web presence pages 24) associated with the registrant 12 in the World Wide Web 11 (or other communications network 11), which are organized as hypertext or hypermedia. The user interface by the network 11 user that is used to implement Web navigation is a web browser provisioned in the user computer device. Examples of Web page navigation mechanisms can include mechanism such as but not limited to:

Web navigations vary in styles between different websites as well as within a certain site. The availability of different navigational styles allows for the information in the website to be delivered easily and directly. This also differentiates between categories and the sites themselves to indicate what the vital information is and to enable the users access to more information and facts discussed within the website. Across the globe, different cultures prefer certain styles for web navigations, allowing for a more enjoyable and functional experience as navigational styles expand and differentiate. Zheng has summarized and compared some common navigation system designs from an information seeking perspective,[9][10] including: Text Links (e.g. anchor text, link label, link text, or link title is the visible, clickable text in a hyperlink); Navigation Bar (e.g. navigation bar or (navigation system) is a section of a website or online page intended to aid visitors in travelling through the online document); Sitemap (e.g. is a list of pages of a web site accessible to crawlers or users. It can be either a document in any form used as a planning tool for Web design, or a Web page that lists the pages on a Web site, typically organized in hierarchical fashion); Dropdown Menu (e.g. in computing with graphical user interfaces, a dropdown menu or drop-down menu or drop-down list is a user interface control GUI element ("widget" or "control"), similar to a list box, which allows the user to choose one value from a list); Flyout Menu (e.g. in computing with graphical user interfaces, a menu that flies out (either down or to the side) when you click or hover (mouseover) some GUI element); Named anchor (e.g. an anchor element is called an anchor because web designers can use it to anchor a URL to some text on a web page. When users view the web page in a browser, they can click the text to activate the link and visit the page whose URL is in the link).

Referring again to FIG. 2, generation module 40 provides for generation of the content of the web presence pages 24 using the registrant information 38 as well as any registrant supplied information 54 via messages 52. As an example embodiment, web presence pages 24 can be generated by generation module 40 (and profile page 27 amended by customization module 50) using a markup language, examples are structural markers such as tags or delimiters (e.g. HTML (HyperText Markup Language), XHTML (Extensible HyperText Markup Language), XML (Extensible Markup Language), etc.). Markup is typically omitted from the version of the text (e.g. content 42,43) that is displayed for end-user consumption of web presence pages 24. Some markup languages, such as HTML, have presentation semantics, meaning that their specification prescribes how the structured data (e.g. content 42,43) are to be presented, but other markup languages, like XML, have no predefined semantics. XHTML can be considered as a blend of HTML and XML capabilities.

As an embodiment of markup language used to construct web presence pages 24 by generation module 40, HTML is one of the document formats of the World Wide Web. HTML, which is an instance of SGML (Standard Generalized Markup Language) is a main markup language for displaying web pages and other information that can be displayed in a web browser. HTML is written in the form of HTML elements consisting of tags enclosed in angle brackets (like <html>), within the web page content (e.g. content 42,43). The purpose of a web browser (of the visitor) is to read HTML documents (of web presence pages 24) and use the HTML and associated delimited content (e.g. content 42,43) to interpret and compose text, images and other material (e.g. content 42,43) into visual or audible web page content (of web presence pages 24). The browser of the visitor does not display the HTML tags, but uses the tags to interpret the content (e.g. content 42,43) of web presence pages 24. Therefore, HTML elements can be used to form the building blocks of content (e.g. content 42,43) of web presence pages 24. HTML can provide for images and objects (e.g. content 42,43) to be embedded and can be used to create interactive forms. HTML can provide a means to create structured documents by denoting structural semantics for text (e.g. content 42,43) such as headings, paragraphs, lists, links, quotes and other items. HTML can embed scripts (e.g. content 42,43) in languages such as JavaScript which affect the behavior of HTML web presence pages 24. Web browsers can also refer to Cascading Style Sheets (CSS) to define the appearance and layout of text and other material (e.g. content 42,43). It is recognized that the structural markers of the markup language (e.g. HTML) can be included in messages 52 for use by customization module 50 in customization of content 43.

Access to web presence pages 24 by network 11 users can be provided by registry operator 20 and/or directory subscription service 22 responsible for generating and maintaining web presence pages 24 (e.g. the page(s) 24 can be hosted by the registry operator 22 and/or the directory subscription service 22). For example, registration module 40 (or another appropriately configured module), operated by registry operator 20 or directory subscription service 22, can be configured to control access by the network 11 users of content 42,43 on web presence pages 24. For example, registration module 40 would have access to respective access credentials associated in storage 18,23 with each set of web presence pages 24. The access credentials (e.g. user name and password, specified user role, etc.) could define what portion of the content 42,43 is allowed access to by the network 11 user. For example, any content classified as public could be accessed by any of the network 11 users (e.g. content 42,43 not associated with a specified or unique set of access credentials). For example, any content 42,43 classified as private (e.g. content 42,43 associated with a specified or unique set of access credentials) could be accessed only by a restricted set of network 11 user(s) (of the plurality of network 11 users) providing the required access credentials to the registration module 40. Further, any content 42,43 classified as registrant (e.g. content 42,43 associated only with the registrant 12 using a specified or unique set of access credentials) could be accessed only by the registrant 12 when providing the required access credentials to the registration module 40.

As such, all or a portion of the content 42,43 of the web presence pages 24 could be available as public access to the network 11 users. Alternatively or in addition to, all or a portion of the content 42,43 of the web presence pages 24 could be available as private access to the network 11 users who present a validated (by the registration module 40) set of access credentials before gaining access to the restricted content 42,43. Alternatively or in addition to, all or a portion of the content 42,43 of the web presence pages 24 could be available as registrant access to registrant 12 who presents a validated (by the registration module 40) set of registrant access credentials before gaining access to the registrant restricted content 42,43. An example of public access could be access to content 42,43 by any general network 11 user not registered, recognized or otherwise associated with registrant 12, i.e. the network 11 user not having had assigned or otherwise having no knowledge of a predefined set of access credentials associated with web presence pages 24 (e.g. known to registration module 40). An example of private access could be access to content 42,43 by any network 11 user registered, recognized or otherwise associated with registrant 12, i.e. the network 11 user having had assigned or otherwise having knowledge of a predefined set of access credentials associated with web presence pages 24 (e.g. known to registration module 40). An example of registrant access could be access to content 42,43 by registrant 12 registered, recognized or otherwise associated with web presence pages 24, i.e. registrant 12 having assigned or otherwise having knowledge of a predefined set of registrant access credentials associated with web presence pages 24 (e.g. known to registration module 40).

In this manner, an advantage of using access credentials to gain access to all or a portion of content 42,43 is that selected portion(s) of content 42,43 can be coordinated by registrant 12 for personal, public, or private consumption.

In view of the above descriptions of storage 18,23 for the computer devices 100 (see FIG. 3) of registry operator 20 and directory subscription service 22, storage 18,23 can be configured as keeping the stored data (e.g. domain name 14, web presence pages 24 respectively) in order and the principal (or only) operations on the stored data are the addition/amendment of or removal of the stored data from storage 18,23 (e.g. FIFO, FIAO, etc.). For example, storage 18,23 can be a linear data structure for containing and subsequent accessing of the stored data and/or can be a non-linear data structure for containing and subsequent accessing of the stored data.

Further, storage 18,23 receives various entities such as data that are stored and held to be processed later. In these contexts, storage 18,23 can perform the function of a buffer, which is a region of memory used to temporarily hold data while it is being moved from one place to another (i.e. between the between computer devices 100). Typically, the data is stored in the memory when moving the data between processes within/between one or more computers. It is recognised that storage 18,23 can be implemented in hardware, software, or a combination thereof. The storage 18,23 is used in the network system 10 when there is a difference between the rate/time at which data is received and the rate/time at which the data can be processed (e.g. ultimately by the devices 100).

Further, it will be understood by a person skilled in the art that memory/storage 18,23 described herein is the physical place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage 18,23 has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory 18,23 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage 18,23 can also be defined as a physical electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

In terms of a server, it is recognised that the computer devices 100 can be configured as hardware, software, or typically a combination of both hardware and software to provide a network entity that operates as a socket listener. It is recognised that any computerised process that shares a resource (e.g. data) to one or more client processes can be classified as a server in the network system 10. The term server can also be generalized to describe a host that is deployed to execute one or more such programs, such that the host can be one or more configured computers that link other computers or electronic devices together via the network 11. The computer devices 100 implementing functionality of registry operator 20 and directory subscription service 22 can provide specialized services across the network 11, for example to private users inside a large organization or to public users via the Internet 11. In the network system 10, the servers can have dedicated functionality and/or can share functionality as described. Enterprise servers are servers that are used in a business context and can be run on/by any capable computer hardware. In the hardware sense, the word server typically designates computer models intended for running software applications under the heavy demand of a network 11 environment. In this client—server configuration one or more machines, either a computer or a computer appliance, share information with each other with one acting as a host for the other. While nearly any personal computer is capable of acting as a network server, a dedicated server will contain features making it more suitable for production environments. These features may include a faster CPU, increased high-performance RAM, and typically more than one large hard drive. More obvious distinctions include marked redundancy in power supplies, network connections, and even the servers themselves.

Figure 3:
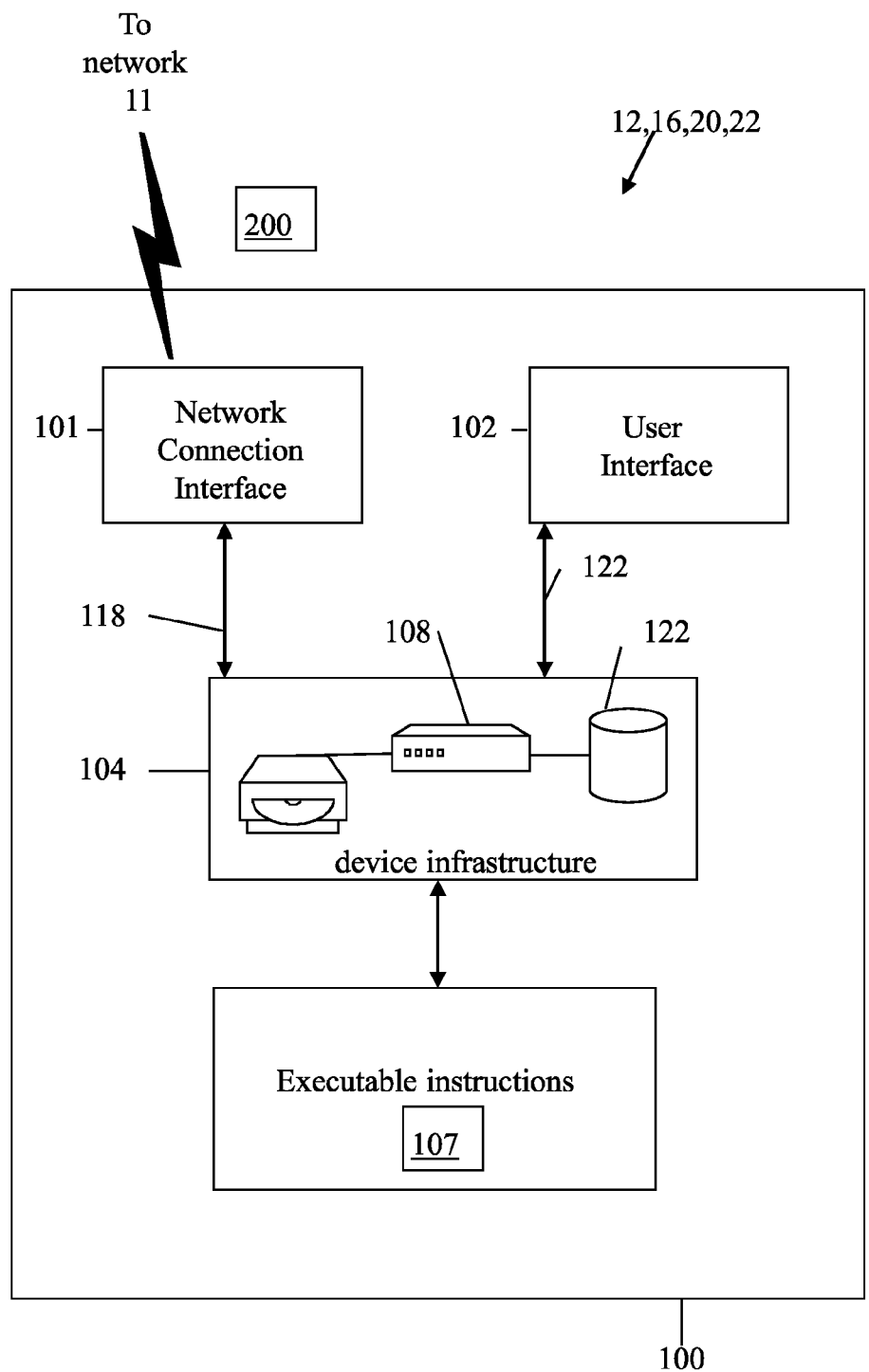
FIG. 3 is an example configuration of a computer device hosting the directory subscription service of FIG. 2.

Referring to FIG. 3, a computing device 100 implementing functionality of registry operator 20 and directory subscription service 22 can include a network connection interface 101, such as a network interface card or a modem, coupled via connection 118 to a device infrastructure 104. The connection interface 101 is connectable during operation of the devices to the network 11 (e.g. an intranet and/or an extranet such as the Internet), which enables the devices to communicate with each other as appropriate. The network 11 can support the communication of the communications 32, 44, 52, and the related content.

Referring again to FIG. 3, the device 100 can also have a user interface 102, coupled to the device infrastructure 104 by connection 122, to interact with a user (e.g. server administrator—not shown). The user interface 102 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 104.

Referring again to FIG. 3, operation of the device 100 is facilitated by the device infrastructure 104. The device infrastructure 104 includes one or more computer processors 108 and can include an associated memory 122 (e.g. memory 18,23). The computer processor 108 facilitates performance of the device 100 configured for the intended task (e.g. of the respective module(s) of directory subscription service 22) through operation of the network interface 101, the user interface 102 and other application programs/hardware of the device 100 by executing task related instructions. These task related instructions can be provided by an operating system, and/or software applications located in the memory 122, and/or by operability that is configured into the electronic/digital circuitry of the processor(s) 108 designed to perform the specific task(s). Further, it is recognized that the device infrastructure 104 can include a computer readable storage medium coupled to the processor 108 for providing instructions to the processor 108 and/or to load/update the instructions 107 (e.g. modules 30,36,40,50). The computer readable medium can include hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid-state memory card, or RAM provided in the memory module. It should be noted that the above listed example computer readable mediums can be used either alone or in combination.

Further, it is recognized that the computing device 100 can include the executable applications comprising code or machine readable instructions for implementing predetermined functions/operations including those of an operating system and the modules, for example. The processor 108 as used herein is a configured device and/or set of machine-readable instructions for performing operations as described by example above, including those operations as performed by any or all of the modules 30,36,40,50. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the modules may be implemented in hardware, software or a combination of both. Accordingly, the use of a processor 108 as a device and/or as a set of machine-readable instructions is hereafter referred to generically as a processor/module for sake of simplicity. Further, it is recognised that the directory subscription service 22 can include one or more of the computing devices 100 (comprising hardware and/or software) for implementing the modules, as desired.

It will be understood in view of the above that the computing devices 100 may be, although depicted as a single computer system, may be implemented as a network of computer processors, as desired.

The invention claimed is:

1. A computer-implemented system for generating web presence pages made available on a network, the system comprising:
a computer processor and non-transitory memory having instructions stored thereon for implementation by the computer processor to:
receive registration information by the computer processor of a domain name by a registrant for a specified top level domain;
parse the registration information by the computer processor to obtain a set of keywords;
search the network by the computer processor using the set of keywords for publically available information about the registrant;
create registrant information by the computer processor based on information obtained from the search using the set of keywords;
generate by the computer processor a trusted web presence page of the web presence pages to include at least a first portion of the registrant information as read only content with respect to the registrant as restricted from customization by the registrant;
control access to the first portion by the computer processor by receiving access credentials associated with the registrant, validating the received access credentials in order to make available access to the first portion by the registrant, and subsequently restricting said access to the first portion by the registrant such that the registrant is restricted from modifying the read only content;
receive customization information from the registrant by the computer processor and modify using the customization information a second portion of registration information other than the first portion to produce customized content;
create by the computer processor a link between a profile page and the trusted web presence page of the web presence pages, the link configured for placement on at least one of the web presence pages such that the profile page and the trusted web presence page would be linked to one another, the profile page including the second portion of the registrant information as the customized content with respect to the registrant such that the registrant is allowed to customize the second portion in view of said access; and
publish by the computer processor the web presence pages on the network including the read only content and the customized content.

2. The system of claim 1 further comprising: generate the profile page using a template to select an initial content; and placement of a second portion of the registrant information on the profile page and publish the profile page on the network.

3. The system of claim 2, wherein some of the second portion of the registrant information contains duplicate content of the first portion of the registrant information.

4. The system of claim 2, wherein the link is positioned on the profile page.

5. The system of claim 1, wherein said information is from trusted information sources having respective publically available information about the registrant which is unbiased towards the registrant.

6. The system of claim 1, wherein the search is performed only on specified sources of the publically available information, such that the specified sources are third party social media sources considered independent of the registrant.

7. The system of claim 1, wherein the search is performed only on specified sources of the publically available information, such that the specified sources are third party news feed sources considered independent of the registrant.

8. The system of claim 1, wherein the search is performed on a predefined periodic basis with the purpose of updating the registrant information.

9. The system of claim 8 further comprising: regenerate the trusted web presence page using the updated registrant information; and republish the trusted web presence page on the network.

10. The system of claim 1 further comprising: update the registrant information based on received notification information associated with the registrant; and republish the trusted web presence page on the network.

11. The system of claim 1, wherein the registrant information includes additional private information from private sources, such that the additional private information is unavailable on the network.

12. The system of claim 1, wherein the registration information is administrative contact information connected with the domain name.

13. The system of claim 12, wherein the registration information includes information about the registrant of the domain name.

14. The system of claim 1, wherein the registration information is associated with a subscription request of the registrant with the directory service.

15. The system of claim 14, wherein the registration information is provided by a registry operator on behalf of the registrant of the domain name.

16. The system of claim 14, wherein the directory service is hosted by a registry operator.

17. The system of claim 2 further comprising: receive a customization request from the registrant including update content; update the customized content using the update content; and republish the profile page on the network.

18. The system of claim 17, wherein the update content includes structural markers of a markup language used to write the profile page.

19. The system of claim 1 further comprising: receive a feedback message including feedback content from the registrant; associate the feedback content with the read-only content and republish the trusted web presence page.

20. A computer-implemented system for generating web presence pages made available on a network, the system comprising:
 a computer processor and non-transitory memory having instructions stored thereon for implementation by the computer processor to:
  receive by the computer processor registration information of a domain name by a registrant for a specified top level domain;
  receive by the computer processor information about the registrant from a plurality of network users;
  combine the information as aggregate registrant information representing crowd sourced content of the plurality of network users;
  generate by the computer processor a trusted web presence page of the web presence pages to include at least a first portion of the aggregate registrant information as read only content with respect to the registrant as restricted from customization by the registrant;
  control access to the first portion by the computer processor by receiving access credentials associated with the registrant, validating the received access credentials in order to make available access to the first portion by the registrant, and subsequently restricting said access to the first portion by the registrant such that the registrant is restricted from modifying the read only content;
  receive customization information from the registrant by the computer processor and modify using the customization information a second portion of registration information other than the first portion to produce customized content;
  create by the computer processor a link between a profile page and the trusted web presence page of the web presence pages, the link configured for placement on at least one of the web presence pages such that the profile page and the trusted web presence page would be linked to one another, the profile page to include the second portion of the registrant information as the customized content with respect to the registrant such that the registrant is allowed to customize the second portion in view of said access; and
  publish by the computer processor the web presence pages on the network including the read only content and the customized content.

21. A computer-implemented system for generating web presence pages made available on a network, the system comprising:
 a computer processor and non-transitory memory having instructions stored thereon for implementation by the computer processor to:
  receive by the computer processor registration information of a domain name by a registrant for a specified top level domain;
  provide by the computer processor access to information about the registrant to a plurality of network users, the information being aggregate registrant information representing crowd sourced content;
  receive by the computer processor individual votes from the plurality of network users on the aggregate registrant information for a specified character of the aggregate registrant information;
  generate by the computer processor a trusted web presence page of the web presence pages to include at least a portion of the aggregate registrant information as read only content with respect to the registrant as restricted from customization by the registrant;
  control access to the first portion by the computer processor by receiving access credentials associated with the registrant, validating the received access credentials in order to make available access to the first portion by the registrant, and subsequently restricting said access to the first portion by the registrant such that the registrant is restricted from modifying the read only content;
  receive customization information from the registrant by the computer processor and modify using the customization information a second portion of registration information other than the first portion to produce customized content;
  create by the computer processor a link between a profile page and the trusted web presence page of the web presence pages, the link configured for placement on at least one of the web presence pages such that the profile page and the trusted web presence page would be linked to one another, the profile page to include the second portion of the registrant information as the customized content with respect to the registrant, such that the registrant is allowed to customize the second portion in view of said access; and
  publish by the computer processor the web presence pages on the network including the read only content and the customized content.

22. The system of claim 1, wherein the instructions further comprise generating the link as a navigational mechanism so as to also restrict the navigational mechanism to read only access in view of said access credentials.

* * * * *